April 21, 1964   M. C. JAHN   3,129,674
AUTOMATIC PIE MACHINE
Filed Aug. 3, 1959   9 Sheets-Sheet 1
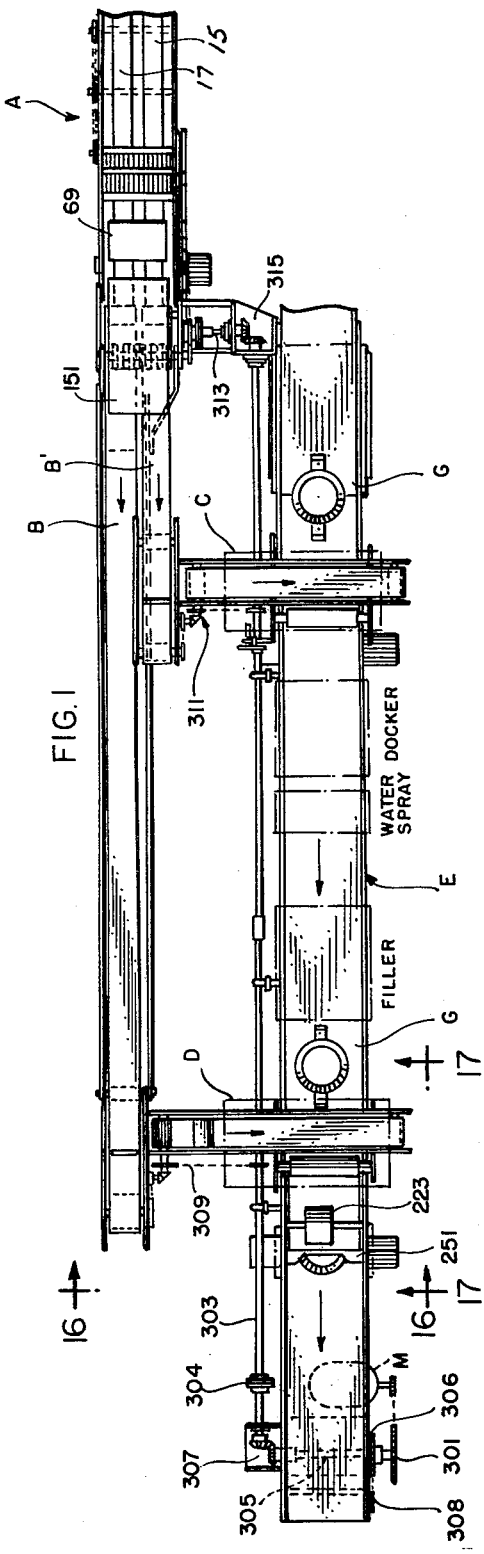
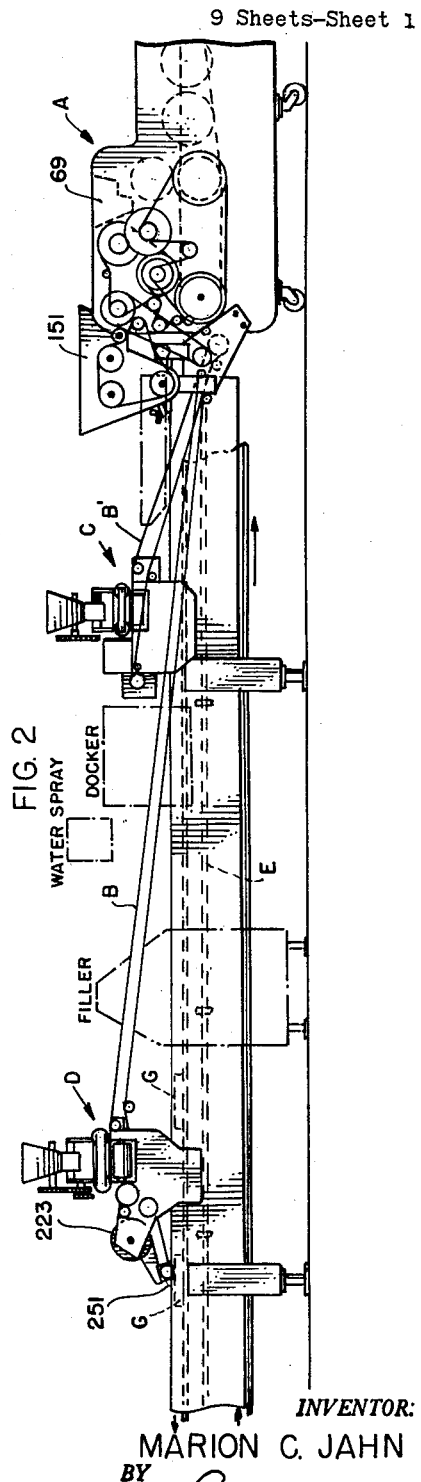
INVENTOR:
MARION C. JAHN
BY
Rummler & Snow
ATT'YS

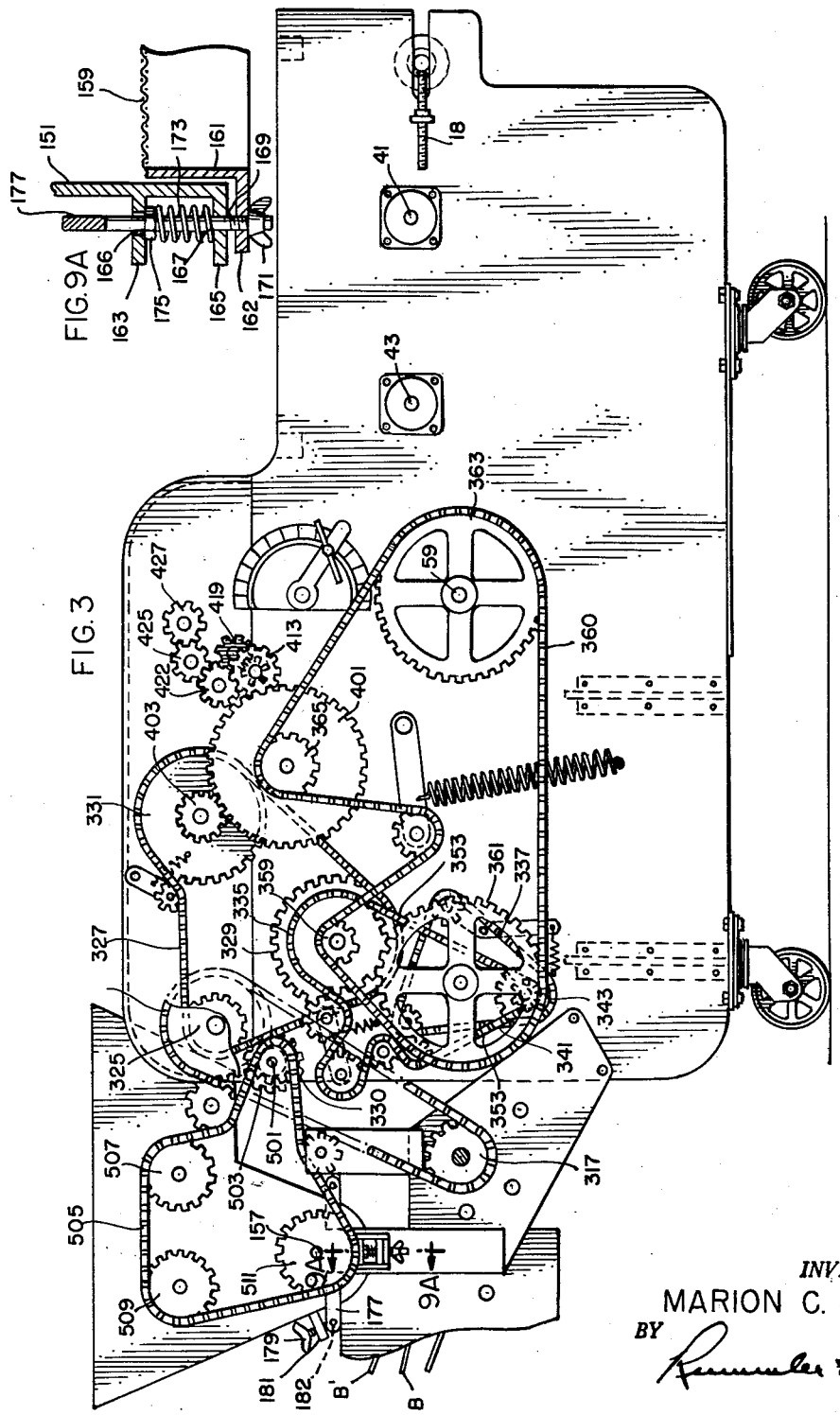

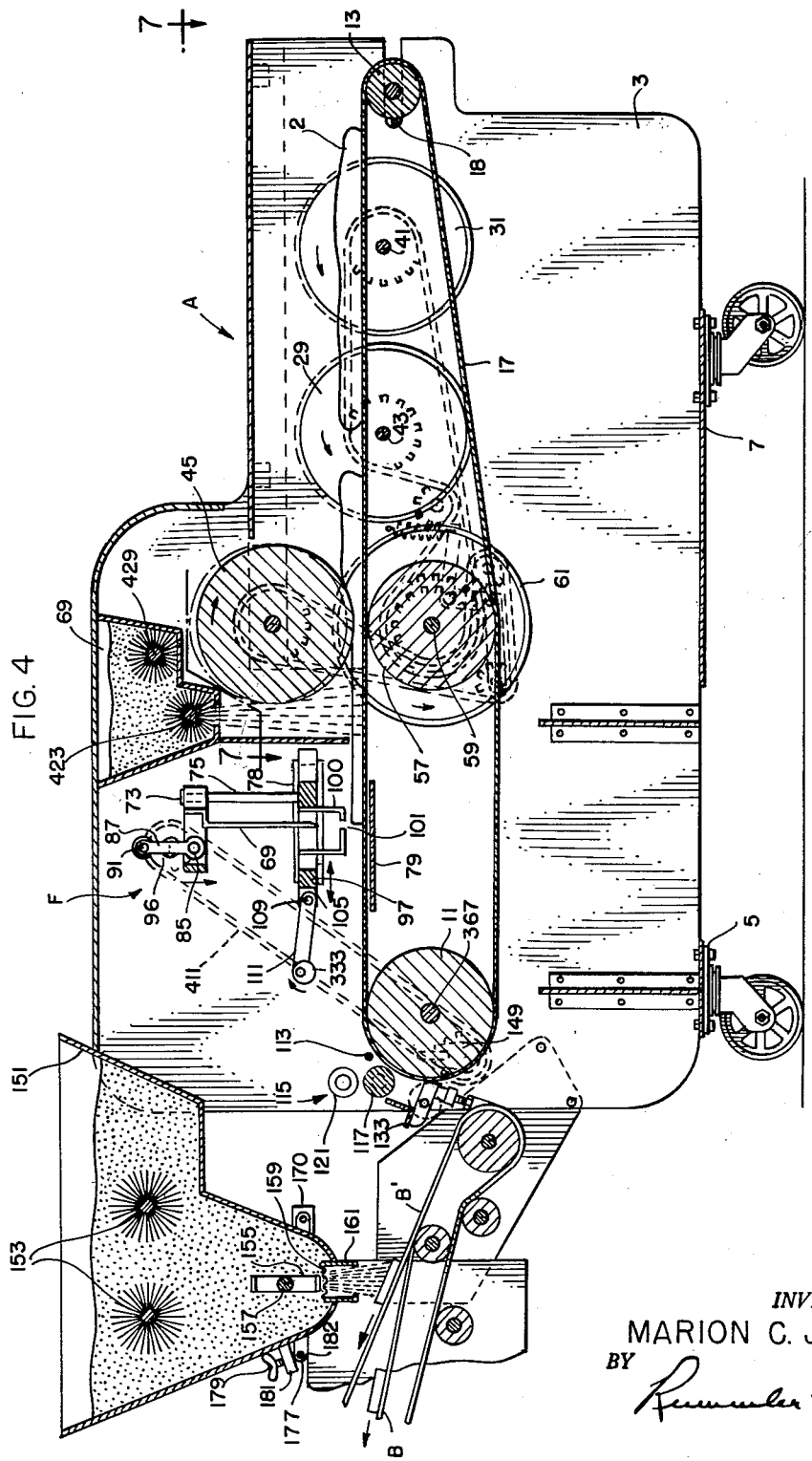

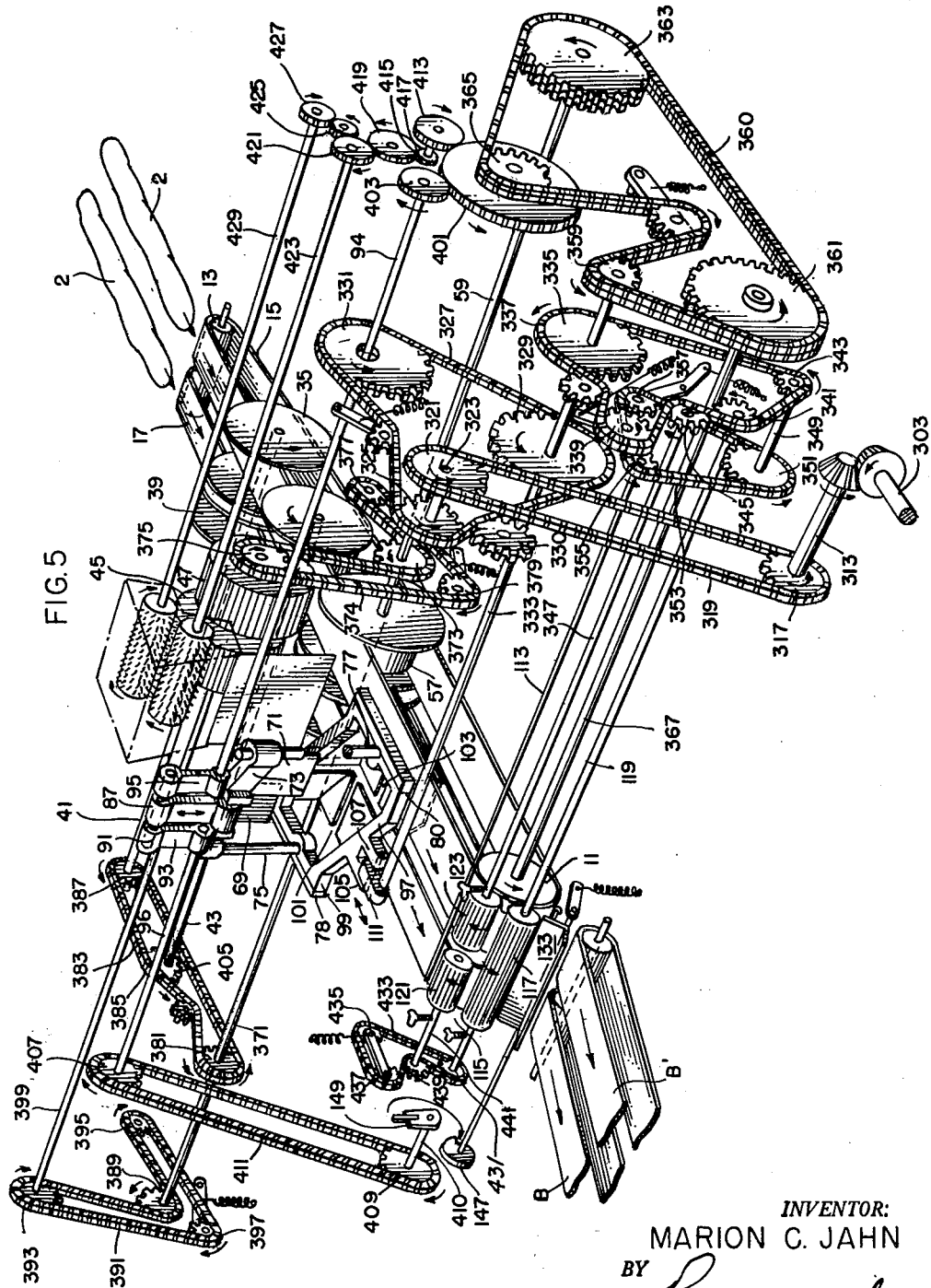

April 21, 1964 M. C. JAHN 3,129,674
AUTOMATIC PIE MACHINE
Filed Aug. 3, 1959 9 Sheets-Sheet 5
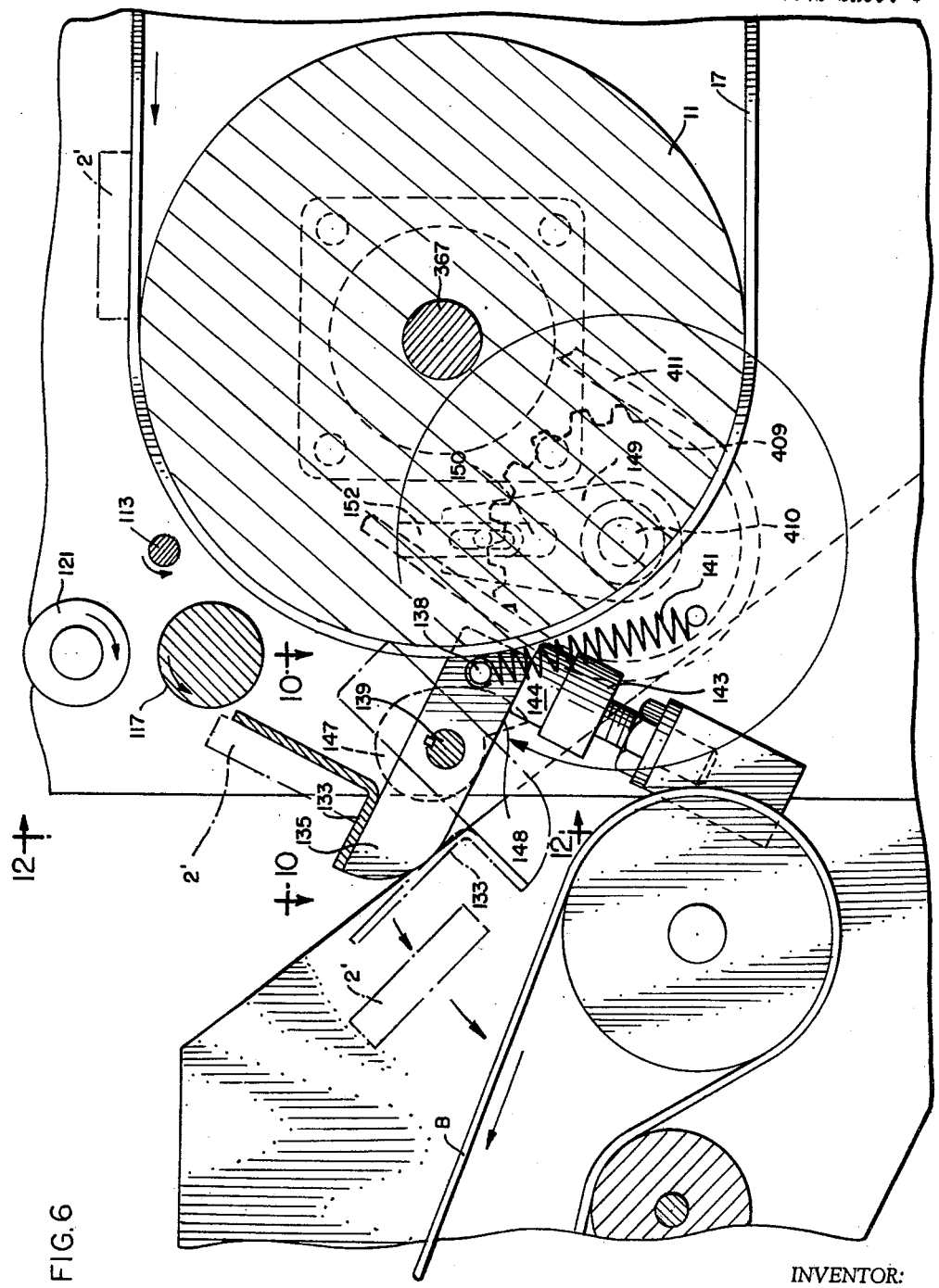
FIG.6
INVENTOR:
MARION C. JAHN
BY
ATT'YS April 21, 1964     M. C. JAHN     3,129,674
AUTOMATIC PIE MACHINE
Filed Aug. 3, 1959     9 Sheets-Sheet 6
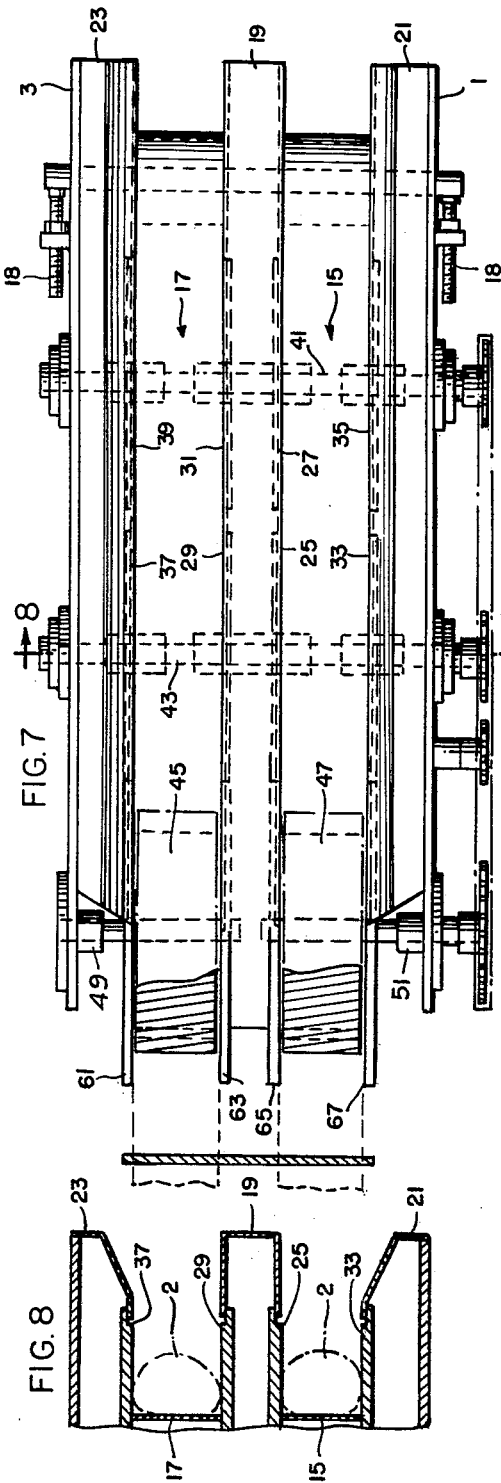
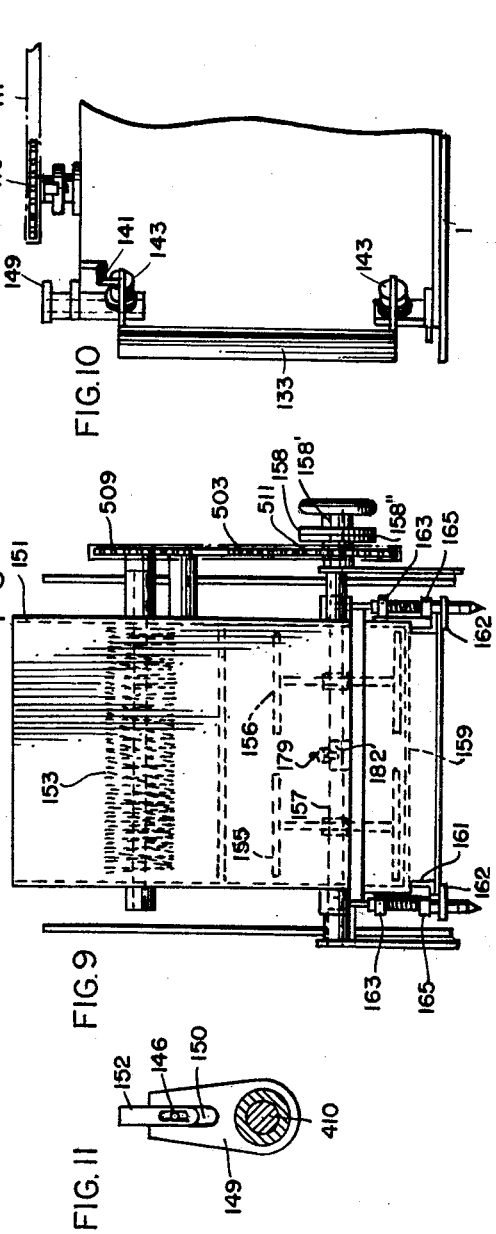
INVENTOR:
MARION C. JAHN
BY
ATT'YS April 21, 1964     M. C. JAHN     3,129,674
AUTOMATIC PIE MACHINE Filed Aug. 3, 1959     9 Sheets-Sheet 7

INVENTOR:
MARION C. JAHN
BY
ATT'YS

April 21, 1964  M. C. JAHN  3,129,674
AUTOMATIC PIE MACHINE
Filed Aug. 3, 1959  9 Sheets-Sheet 8

INVENTOR:
MARION C. JAHN
BY
ATT'YS

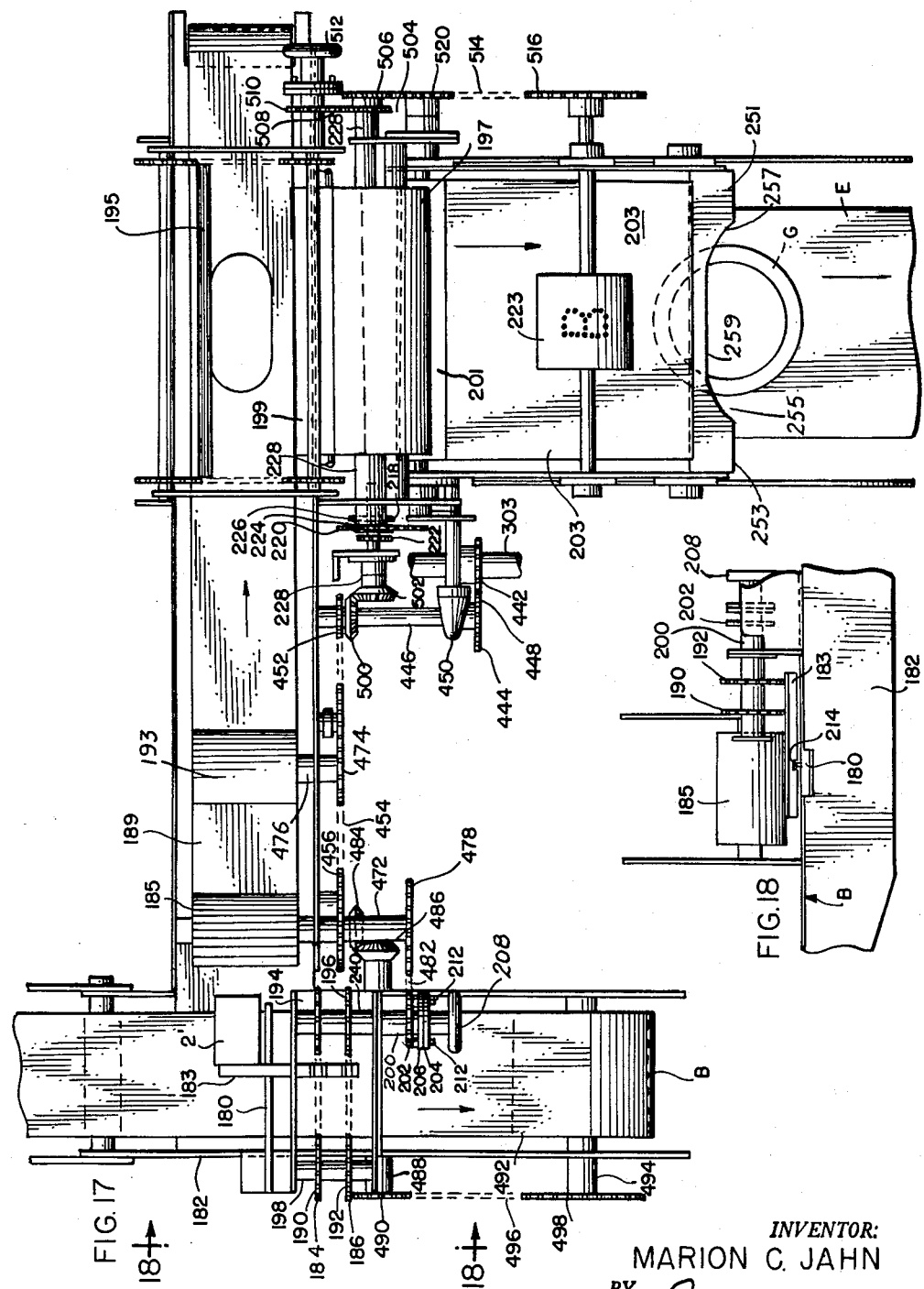

United States Patent Office 3,129,674
Patented Apr. 21, 1964

3,129,674
AUTOMATIC PIE MACHINE
Marion C. Jahn, Chicago, Ill., assignor to Colborne Manufacturing Company, Chicago, Ill., a corporation of Illinois
Filed Aug. 3, 1959, Ser. No. 831,165
10 Claims. (Cl. 107—12)

This invention relates to continuous automatic pie making machines and particularly to an automatic pie making machine for producing pies having upper and lower crusts enclosing filling material.

One of the most costly aspects of producing prepared pies for commercial delivery is the need for considerable labor in order to accomplish the various steps necessary to achieve a finished pie product.

This use of labor and manual operations to accomplish certain of the steps in the pie making process is further disadvantageous in that it often results in lack of uniformity in the finished product and, further, slows the entire process to the speed of the slowest of the human workers involved in the various functions and operations to be performed.

Therefore, it is a primary object of this invention to provide an automatic pie making machine which is capable of preparing pies, having upper and lower crusts enclosing filling material, and which eliminates all manual steps and reduces to a bare minimum the amount of human labor necessitated to supervise the operation of the machine.

Further objects of this invention are to provide an automatic pie making machine embodying an arrangement of elements of specific design which cooperate to minimize the time to complete the pie making process and which produces a uniform product of extremely high quality; which arrangement utilizes a minimum of space; and which specific elements are capable of a wide range of adjustment to increase the adaptability thereof to a variety of applications and desired types of end products.

Further objects and advantages of this invention will become evident as the description proceeds and from an examination of the accompanying drawings which illustrate a specific embodiment of the invention.

In the drawings:

FIGURE 1 is a diagrammatic plan view of a preferred embodiment of an automatic pie making machine according to the invention and in which certain components of the machine are omitted for clarity and others are indicated by dotted outline to show their location;

FIG. 2 is a side elevational view of the embodiment shown in FIG. 1 wherein certain elements omitted from FIG. 1 are included;

FIG. 3 is a side elevational view of the divider subassembly;

FIG. 4 is a side elevational view in section of the apparatus shown in FIG. 3;

FIG. 5 is a power diagram showing the manner of operation of the divider sub-assembly from a single power source;

FIG. 6 is an enlarged detail view in side elevation of the dough-block inverting mechanism of the divider apparatus;

FIG. 7 is a fragmentary plan view of the dough feed portion of the divider;

FIG. 8 is an enlarged cross-sectional view of the feed portion of the divider mechanism taken substantially on the plane of line 8—8 in FIG. 7;

FIG. 9 is a front end elevational view of the dough-block duster device shown in FIG. 4;

FIG. 9a is an enlarged fragmentary sectional view of the flour sifter element mounted in the duster device;

FIG. 10 is a detailed plan view of the dough-block flipper or turn-over mechanism taken substantially on the plane of line 10—10 in FIG. 6;

FIG. 11 is a detail view of the dough-block flipper actuating means;

FIG. 17 is a plan view of the cross-sheeter as seen from the top of FIG. 15; and FIG. 18 is a fragmentary end elevation of the cross-sheeter as viewed from line 18—18 of FIG. 17.

Figure 12:
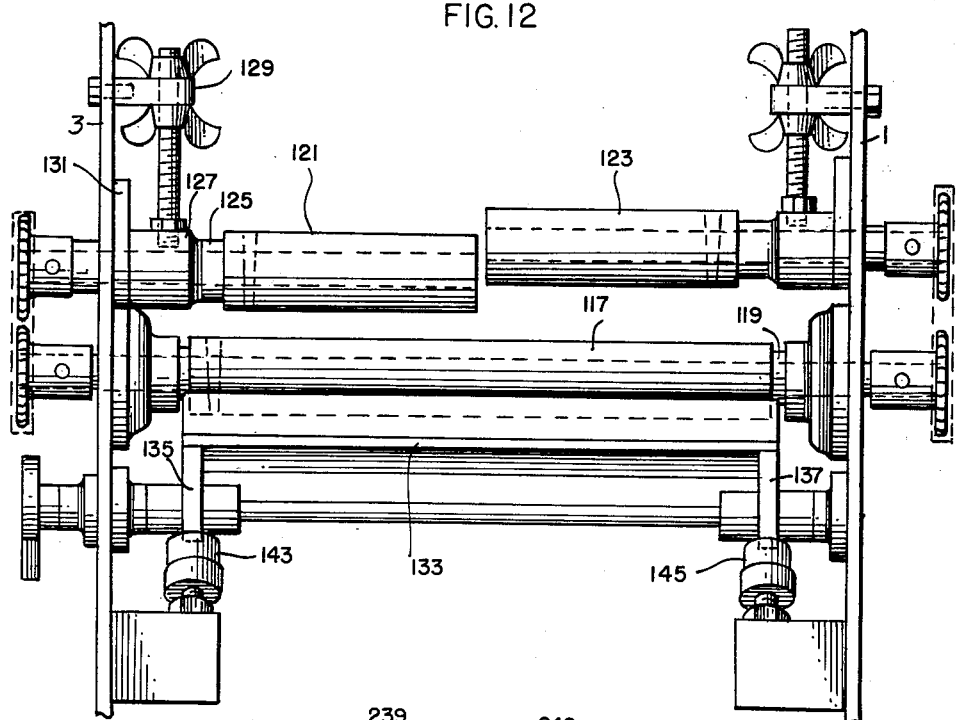
FIG. 12 is an end elevational view of the split roller dough-block timing mechanism and the flipper or inverter mechanism taken substantially from the plane of line 12—12 in FIG. 6.

The automatic pie making machine which is the subject of the instant invention is specifically designed to receive two elongate rolls or slabs of prepared pie dough and to automatically translate these slabs into a completed pie, including a shell and cover, appropriately filled and ready for baking without the intervention of any manual steps during the pie making process. To accomplish this, the automatic pie machine is comprised generally of a dough divider A which is adapted to receive two slabs and convert them into two aligned rows of rectangular blocks of dough of different thicknesses, to accommodate the different quantitative dough requirements of the shell and the cover sheet, and which dough divider also includes means for flouring one side of the dough slabs as well as means to flip or turn over the divided dough blocks for flouring them on the opposite sides. The automatic pie machine further includes parallel conveyor belts B and B' for delivering the divided dough blocks of each row to respective and appropriately placed cross-sheeters C and D. Cross-sheeter C forms successive dough-blocks individually into successive bottom sheets which are deposited individually onto respective pie plates G located on suitable pie plate holders secured to move with a main conveyor belt E. On the main conveyor belt E the pie plates carrying the bottom dough sheet are moved through a succession of steps including docking or pressing the sheet into the pie plate and the removal of excess pie dough, a water spray means and a filler mechanism for depositing the appropriate filler material into the pie shell. As the pie shell moves toward the second cross-sheeter D, the second cross-sheeter D is receiving a dough block from the other row and in precisely timed relation with the movement of the plates G forming it into a top sheet which is then automatically deposited over the pie shell and filling as the main conveyor E moves the pie shell past the second cross-sheeter D.

The main conveyor may then deliver the prepared pie into an appropriate oven for baking.

Thus, the essential concept of this invention is to produce and deliver to respective cross-sheeters two continuous rows of rectangular dough-blocks, in which a definite dough-grain has been established, then to cross-roll each block of each row, twice in successively transverse directions to convert it to circular disc-like sheet form of the desired size, dough-grain character and final thickness for pie shells and cover sheets, respectively, and then to deposit the formed sheets individually and successively onto pie plates carried serially by a continuous conveyor moving along a predetermined path, all in precisely timed and synchronized relation with the movement of the pie plates on the said conveyor and without the intervention of any manual operation.

To carry out this concept a machine involving several novel structural and operational features is required and therefore to best describe the machine and point out the novel features thereof, each component of the machine will be hereafter described individually and in the order of its sequence in the operation of the machine.

The Dough Divider

The function of the dough divider is to receive two elongated dough slabs and to form them into a succession of dough blocks floured on each side in preparation for being delivered to the respective cross-sheeters C and D. More specifically, the structure of the subject dough divider includes parallel continuous conveyor belts for conveying elongated dough slabs through independent rolling means which cooperate with parallel troughs for shaping the dough longitudinally, a first duster for dusting one side of the dough slab, a cutting means for forming the dough slabs into successive blocks on each conveyor and a flipping means for inverting or turning the dough blocks over and onto conveyor belts B and B' for conveying the successive blocks under an intermittent duster, for dusting the opposite sides of said blocks, and then to the respective cross-sheeters C and D.

As best seen in FIGS. 4, 7 and 8, dough divider A is supported by side frames 1 and 3 secured to transverse base members 5 and 7. Movement of the dough slabs 2 through the dough divider A is provided by two laterally spaced and parallel conveyor belts 15 and 17. These conveyor belts extend between and travel over the spaced conveyor rollers 11 and 13 horizontally journalled in the divider side frames 1 and 3. It is to be noted that the conveyor roller 13 is mounted with appropriate and conventional adjusting means 18 facilitating the adjustment of this roller forwardly and rearwardly so as to keep the belts in a taut condition.

As best seen in FIGS. 7 and 8, the conveyor belts are adapted to cooperate with three housing guides, the first guide 21 being located adjacent the outer edge of the conveyor belt 15, the central housing guide 19 being located between the two conveyor belts 15 and 17, and the third housing guide 23 being located on the outer side of conveyor belt 17. These housing guides cooperate with the respective conveyor belts 15 and 17 to form an elongated trough for receiving dough slabs 2 as indicated in FIG. 8.

The troughs are further provided with rotating disc members 25, 27, 33, 35, 29, 31, 37 and 39 on either side of the respective belts and adapted to rotate within cut-out portions of the side walls of the respective housing guides. These disc members are journaled below the conveyor belts and extend upwardly on each side thereof in the respective planes of the trough sidewalls. Thus the rotation of these discs, in the direction of conveyor travel, insures that the dough slabs will not stick to the walls of the housing guides and further aids in moving the dough slabs through the troughs toward the pressure rollers 45 and 47. As best seen in FIG. 8, the discs may be marginally recessed adjacent their outer circumference in order to overlap the margins of the cut-out openings and close the same and yet present a flat dough engaging surface in the same plane as the remainder of the guide sidewalls. The disc members 27, 31, 35 and 39 are mounted on shaft 41 appropriately journaled for rotation in the divider side frames 1 and 3; and the disc members 25, 29, 33 and 37 are appropriately secured to shaft 43 journaled in divider side frames 1 and 3.

As the elongated dough slabs are moved forwardly from right to left as viewed in FIG. 7, by the conveyor belts 15 and 17, the slabs are confined to a relatively consistent cross-sectional area by the housing guides 19, 21 and 23 and are delivered directly to the ribbed pressure rollers 45 and 47 as best seen in FIG. 5. The pressure rollers 45 and 47 are journalled eccentrically in rotatable hubs 49 and 51, which in turn are journalled in the divider side frames 1 and 3 (see FIG. 7) to provide adjusting means for controlling the elevation of the rollers individually with respect to the corresponding divider conveyor belts 15 and 17. Eccentric adjusting means of this kind are commonly known and are shown in more detail in my Patent No. 3,002,471 and in Patent No. 2,898,873 to Stanley Cale. The reason for varying the elevation of the rollers 45 and 47 is that the rollers which would be used to compress the dough slabs into blocks to be used for forming the bottom pie sheet must provide a thicker block than the rollers which form the block for the top sheet, since more dough is needed for the bottom pie sheet than for the top sheet due to the extra dough necessitated in forming the dough sheet into a shell. In my Patent 3,002,471, rotatably adjustable hubs for eccentrically journalling a roller shaft are shown at 16 and 24 in FIGURES 1 and 3; and in the Cale Patent 2,898,837, such hubs are shown at 32 in FIGURES 1 and 3.

A lower roller 57 is provided to support each conveyor belt beneath the respective upper pressure rollers 45 and 47 and these lower rollers are appropriately mounted on a shaft 59 which is suitably journaled in the divider side frames 1 and 3. Shaft 59 also has secured thereto appropriate rotating discs or flange members 61, 63, 65 and 67 at opposite sides of the respective conveyor belts 15 and 17 which overlap the ends of the respective pressure rollers and thereby define walls for the openings between the pressure rollers and the conveyor belts. These rotating flange members also aid in the movement of the dough through the said opening while assuring that a substantially uniform cross section for the finished dough block is maintained.

After the dough slabs leave the upper ribbed rollers 45 and 47, they emerge as strips having a substantially rectangular shape in cross section. The strips are then carried by the conveyor belts 15 and 17 past a conventional flouring device 69 located directly above the conveyor belt and in overlapping relation with the periphery of the upper ribbed pressure rollers 45 and 47. This flouring means may include agitators in the form of rotary brushes to insure uniform sprinkling of the upper surfaces of both the compressed dough strips and the pressure rollers.

After emerging from the pressure rollers and being floured, the dough strips move forwardly into the divider cutter shown generally at F. The function of the divider cutter is to cut the elongated dough strips into rectangular blocks for subsequent delivery to the conveyors B and B' which transport them to the cross-sheeters C and D. It will now be observed that the dough has been "sheeted" or rolled once so that a definite, preliminary grain character has been imparted to the dough in its block form.

The two cutter blades 69 and 71 are adapted to be reciprocated vertically to cut the respective dough strips moving on conveyor belts 15 and 17. The blades 69 and 71 are secured to a bridge 73 in an offset relationship longitudinally so that the cut made across one strip will be made one-block-width in advance of the cut across the other strip.

The bridge member 73 is provided with appropriate apertures at either end for slideably receiving the upright guide rods 75 and 77 respectively. As shown, the bridge member 73 is provided with a central wrist pin 85 which is received in a bore in one end of a double ended link member or connecting rod 87. The other end of the connecting rod 87 is provided with a bore to receive a crank pin 91 which also extends between two crank arms 93 and 95. The crank arms 93 and 95 are mounted on shafts 94 and 96, respectively, which upon rotation cause reciprocation of the connecting rod 87 which in turn moves the bridge and the cutting blades 69 and 71 up and down to cut the dough strip into blocks against the conveyor belts which are supported for this operation by a support plate 79.

A longitudinal slide member 97 cooperates with the reciprocating bridge and blades to move the same forwardly during the cutting process to follow the movement of the dough strips and prevent "bunching" of the strip while being cut.

The longitudinal slide member 97 is comprised of an outer frame portion 99 and includes two staggered stripper devices 100 having slot-like openings 101 and 103 corresponding in longitudinal position to the cutter blades 69 and 71. These strippers prevent the dough from being pulled upward by the cutter blades. The opposing sides of frame member 99 are secured to the vertical guide members 75 and 77, respectively, and are slideably received for forward and rearward motion within guide ways 78 and 80 secured vertically and horizontally by means not shown. The forward end of the longitudinal slide member includes two forwardly extending arms 105 and 107. A cross shaft 109 is supported by these arms and rotatably receives one end of a connecting arm 111. The other end of the connecting arm is secured to a rotatable crank shaft 333. As the crank shaft rotates, the connecting arm 111 pulls the longitudinal guide frame 99 forwardly in guideways 78 and 80 and with it the bridge 73 and cutters 69 and 71 to follow the movement of the conveyor as the blades cut through the dough strips.

It will now be seen that the divider acts simultaneously on two separate streams of dough to form automatically parallel rows of dough blocks, each row comprising blocks of different thickness for forming tops and bottoms respectively for the pies to be made by the machine. It will also be seen that the initial dough slabs 2 are continuously fed to the pressure rollers with a minimum of resistance or drag on the sides of the dough troughs, because of the rotating flanges or discs inset into the side walls of the troughs and comprising a major part of the total area thereof, thereby minimizing the power required to drive the conveyor belts 15 and 17.

*Dough-Block Turn-Over Mechanism*

As the dough blocks proceeds from the divider cutter F on the conveyor belt to the distal end, they have been floured on only the upper surface. As the blocks leave the conveyor belts 15 and 17, their forward motion and vertical support is provided by a spinner roller 113 which engages the bottom side of the dough blocks and prevents them from following the conveyor belts as they turn at the end of their run. The spinner supports the dough blocks vertically and projects them at increased speed forwardly into the adjustable timing rollers, designated generally at 115 (FIGS. 4 and 5), which then deliver the blocks onto the flipper or turn-over blade 133. As best seen in FIG. 12, the lower timing roller 117 is secured for rotation with shaft member 119 appropriately journaled in the divider side frames 1 and 3. Coacting with this lower timing roller 117 are two upper rollers 121 and 123 disposed immediately above the said lower roller. These upper rollers are each adjustably spaced from the lower roller to correspond with the thickness of the dough blocks being received from the pressure rollers. Upper roller 121 is secured to a shaft rotatably mounted in the hub 125 of a sleeve 127 adapted to be moved vertically by an adjusting means shown generally at 129, in order to properly position the upper roller 121 with respect to the lower roller 117. Sleeve member 127 is appropriately provided with a flanged portion 131 which is secured to the divider side frame 3 for vertical movement but otherwise offering firm support for the shaft mounting the roller 121. The upper timing roller 123 is similarly mounted on the opposite side frame 1. The function of these timing rollers is to assure that a dough block from each divider conveyor will be delivered to the turnover blade at the same time and at a sufficient rate to make way for the next succeeding pair of dough blocks.

After the dough blocks have been moved forwardly through the timing rollers 115, gravity forces them downwardly on their forward ends onto an elongated substantially right angular member or flipper blade 133. At either end of angle member 133 and beneath the receiving surface of the angle member are lever arms on which the member 133 is mounted. Lever arms 135 and 137 extend rearwardly from the lower surface of the angle member and are fixedly mounted on a horizontal rock shaft 139 suitably journaled between the divider side frames. The extreme rearward ends of the lever arms 135 and 137 are provided with studs 138 for receiving one end of a spring member 141 which may be appropriately attached to the divider frame so as to pull the arms and channel member in a clockwise direction about the axis of the shaft 139 as viewed in FIGS. 4 and 6. Appropriate adjustable stop members 143 and 145 are secured with respect to the frame of the divider and are positioned to contact the rearwardmost end of the lever arms 135 and 137 to limit the extent of their clockwise rotation. Each of these stop members is also provided with a rubber bumper head 144 which serves as a shock absorber to cushion the retractive force of the springs 141.

In order to actuate the flipper mechanism, the outer end of shaft 139 carries a cam-shaped crank arm 147 having a single flat-faced radial tooth 148 which is adapted to be engaged by a rotating cam lever 149 which drives the crank-arm 147 and the angle member 133 in a counter-clockwise direction until such time as the angle member achieves the downwardmost position of travel, at which point the cam lever 149 slips off the radially projecting tooth 148 and permits the member 133 to return clockwise to its first position under the influence of the spring member 141 (FIG. 6). It is to be particularly noted that the flipping of the dough-blocks is intrinsically related to the degree of rock or reciprocation of the rock shaft 139 caused by the cam lever 149. To provide adjustment of the angular extent of rocking or rotary reciprocation of rock shaft 139 the cam lever 149 is provided with a radially extending insert groove 150 which slideably receives a radially adjustable cam trigger 152 provided with a radially extending slot adapted to receive a bolt for adjustment of the trigger radially. The further the trigger 152 extends radially outward the greater the degree of rock or reciprocation of the angle member 133. The appropriate time of the actuation of the cam lever 149 and cam trigger 152 will be discussed further as the specification proceeds.

It will be seen from the foregoing, that as the angle member 133 is rotated counter-clockwise, a dough-block 2' thereon is completely flipped over or inverted onto the respective conveyor belt B therebeneath. This inversion of the dough-blocks, as they are delivered by the divider to the conveyors which carry them to their respective cross-sheeters, permits flour-dusting of what were initially the bottom sides so that the blocks will be coated on all sides and precluded from sticking to any other part of the machine that they might contact. Also the flipper mechanism assures that parallelly related blocks, for the top and bottom crusts of a pie, will be delivered to the conveyors B—B' simultaneously and in precisely timed relation with all subsequent operations performed by the pie making machine.

*Intermittent Duster*

It has been shown by the previous discussion how the flipper mechanism turns over the dough blocks so as to expose the underneath side for flouring. This flouring of the turned dough blocks, on the conveyors B and B', is accomplished by the use of an intermittent duster apparatus which is adapted to deposit flour in a predetermined pattern onto the exposed upper surfaces of the dough blocks as they pass beneath the duster, the pattern of each flour deposit being substantially equal in area to the area of the dough block, and each deposit being timed with the passage of the dough blocks beneath the duster so as to precisely register with the dough blocks.

As best seen in FIGS. 4 and 9, the intermittent duster includes a hopper member 151 which is appropriately tapered downwardly and inwardly so as to assure the downward flow of flour. The hopper also includes agitating means 153, in the form of rotating brushes, to further assure a smooth flow of flour downwardly toward the outlet openings. The intermittent deposition of flour on the dough blocks moving under the hopper is achieved by the use of rotating scrapers 155 and 156 timed to rotate, in close proximity with a sifting screen, contemporaneously with the arrival of the dough blocks therebeneath for dusting. This concept permits fairly precise dusting of the block surfaces and obviates continuous dusting of the belts B and B'.

Each of the scrapers 155 and 156, each corresponding in position to conveyor belts B and B' and substantially equal in width to the dough-blocks on the conveyor B and B', is appropriately secured on a shaft 157 for rotation thereby and although as shown in FIG. 4 each scraper embodies two blades positioned 180° from each other, each scraper could comprise but a single blade. The sifting device is comprised of an elongated partially cylindrical mesh screen member 159 which is secured to the top of a frame structure 161 comprising four sides, of which the two opposing longitudinal sides are formed with outwardwardly extending flanges 162 adapted to cooperate with means for elevating or lowering the screen surface 159 in respect to the scraper member 155.

Each side of the hopper frame is formed with two spaced ears 163 and 165 as seen in FIG. 9a extending horizontally and laterally outwardly from the body of the hopper and including aligned apertures 166 and 167 adapted to receive a threaded bolt member 169 therethrough. Bolt member 169 is provided with a wing nut 171 at the lower end and a compression spring member 173 is positioned between the respective ears 163 and 165 so as to bear upwardly against a nut 175 threaded on the bolt and adapted to compress the spring when the bolt member is moved downwardly. The upper ends of the bolt members 169 are adapated to be contacted by spaced pivoted adjustment arms 177 at either side of the hopper frame. The rearward ends of these arms are pivoted rearwardly of the hopper frame on ears 170 and the forward ends are adapted to be pushed downwardly on the top surfaces of bolts 169, against the force of the spring members 173, by a wing bolt 179 threadedly received in a centrally located forwardly projecting ear 181 and bearing against cross rod 182 connecting the forward ends of arms 177, the ear 181 being integral with the hopper. Due to the action of the springs 173, the tightening or loosening of the wing bolt 179 will raise or lower the semi-cylindrical screen surface 159 with respect to the scraper blades 155. It is to be noted that with this adjustment arrangement, the closer the screen is moved to the scraper blades, the greater the amount of flour which will be deposited on the exposed surfaces of the dough squares upon each passage of the blade across the screen surface. Conversely, the farther away the screen is moved from the scraper blades, the smaller the amount of flour which will be deposited on the exposed surfaces. Thus the quantity of flour deposited at each stroke of the scraper blades can be precisely adjusted and controlled.

The sifter screen 159 and its frame 161 extend across the entire width of the parallel conveyors B and B'. The depositor blades 155 and 156, however, are each of a length corresponding with the length of the dough-blocks and each is centered directly above the line of travel of the dough-blocks on their respective conveyors B and B'. The width of the frame 161, in the longitudinal direction of the conveyor, is substantially the same as that of the dough-blocks and the depending sides of the frame confine the falling flour so that it will not spread beyond the width of the dough-block area. Thus, at each passage of the scraper blades 155–156 over the screen 159, a fairly precise rectangular pattern of flour will be deposited onto the surface of the dough-blocks carried by the conveyors if they are properly positioned below the depositor at the time.

As before explained, the flipper mechanism 133 is designed to deposit two dough-blocks, one on each of the conveyors B and B', each time the flipper is operated. The dough-blocks on the two conveyors are thus in precise transverse alignment. The spacing of succeeding dough-blocks lengthwise of the conveyors is, of course, a function of the speed of the conveyors B and B' relative to the rate of operation of the flipper mechanism. Thus the rotation of the depositor scraper blades must be timed to the rate of the flipper mechanism operation and the location of the depositor in advance of the flipper will be determined by the speed of travel of the conveyors B and B', whereby the intermittent deposit of flour will occur precisely at the time the aligned dough-blocks on the conveyors B and B' are directly below the sifter screen 161. The timing of these scraper blades relative to the position of the dough-blocks on the conveyors B and B' is accomplished by means of an adjustable clutch 158, having a handle 158', slideably keyed to the shaft 157 and drivingly engaging the flange of the hub 158" on the drive sprocket 511 (see FIG. 9). The clutch 158 is adapted to be axially disengaged from the flange 158" and then adjusted angularly relative to the sprocket 511, before being re-engaged, so as to adjust the angular position of the scraper blades about the axis of the shaft 157 and to correlate the action of the scrapers on the screen 159 with the movement of the dough-blocks on the conveyors B and B'.

*Main Conveyor*

In the functioning of the instant automatic pie making machine, it appears desirable to set forth the progressive stages which occur in regard to pie making as the main pie plate holder conveyor is moving forwardly through the various steps toward the baking oven. Indeed the specific functions of the divider and of the cross-sheeting mechanisms will be best understood by first examining the step by step progress of the main conveyor.

The main plate holder conveyor shown generally at E is adapted to move from right to left as viewed in FIG. 1. An appropriate pie plate holder or holders are affixed for movement with the conveyor and are adapted to receive pie plates. The first step in the pie making process is to place the pie plates on the pie plate holders, by automatic means (not shown) forming no part of the present invention, the conveyor belt E then moving the plates successively beneath the cross-sheeter C which automatically deposits a circular sheet of dough on each plate. As the main conveyor moves forwardly, the pie plate is subjected to a docker which trims the excess dough from the plate and forms the dough into the concavity of the plate. Next, the dough shell formed by the docker is subjected to a water spray and the plate then is moved forwardly to a filler which deposits automatically the appropriate filling into the shell. The filled shell is then moved by the main conveyor past the second cross-sheeter D which automatically deposits a marked and/or slitted top sheet onto the filled shell. Further on, the finished product may be subject to an automatic trimmer to remove the excess top dough and may then be moved forwardly into an appropriate oven for baking. Thus, it will be seen from this explanation that the locations of the cross-sheeters must be sufficiently spaced along the main conveyor to permit the intervening steps to occur. It is the function of the divider A and the conveyor belts B and B' to supply dough-blocks of appropriate size to the cross-sheeters C and D in timed relation with the movement of the main conveyor E so that an appropriate bottom sheet and top sheet can be made and deposited onto each pie plate when it reaches the point in the pie making process where that operation is required. The function of the cross-sheeters is to convert the dough-blocks into finished circular dough sheets of appropriate size and grain character and to then deposit said sheets onto the plate holders at the appropriate time.

*Cross-Sheeters*

The cross-sheeters C and D are practically identical in form and in function, both being of the type which first cross-rolls a dough-block into an elongated elliptical sheet and then subjects the elliptical sheet to cross-rolling in the transverse direction to achieve a substantially circular sheet of desired diameter and thickness for delivery onto the pie plate or filled shell. It will be understood that as the dough-blocks are produced by the divider, the dough has been sheeted or rolled once to establish a definite grain in the body of the dough. This grain runs in the direction of dough travel through the divider and since the conveyors B and B' move in the same direction and the blocks retain their same relative position on the conveyors as when they emerge from the divider the grain in the blocks will be parallel with the outer lines of the conveyors and the first rolling operation in either cross-sheeter will be across the grain.

As indicated in FIG. 17, the dough-blocks 2' are carried to the respective cross-sheeters by the conveyor belts B and B' with the long dimension of each block extending transversely of the respective conveyor.

At the appropriate cross-sheeter station the blocks engage the stop bar 180 which aligns each block precisely with its forward edge at a ninety degree angle with respect to the conveyor sides. Stop bar 180, as best seen in FIG. 17, is cantilevered just above the surface of the conveyor belt B and secured to one side 182 of the conveyor frame. While the block is being held by the stop bar 180 in a precise longitudinal position and laterally aligned, a continuously moving pusher bar 183, traveling transversely of the conveyor belt B, moves into contact with the captive dough-block.

The pusher bar 183 is supported from two spaced drive chains 184 and 186 supported for rotation laterally over the conveyor by means of sprocket pairs 190, 192 and 194 and 196. Two idler sprockets 190 and 192 are secured to a shaft 198 which is rotatably journaled in suitable supports mounted on the conveyor side frame 182.

The drive sprockets 194 and 196 are mounted for rotation on shaft 200 driven from the main drive shaft by means to be described. Shaft 200 is adapted to drive the two drive sprockets 194 and 196 by means of an adjustable clutch mechanism which permits the pusher bar 183 to be accurately timed to engage the dough-block for pushing it toward the cross-sheeter pressure rolls.

The adjustable clutch mechanism is similar in operation and construction to the adjustable clutch mechanism previously described in connection with the intermittent duster. As seen in FIG. 17, the adjustable clutch comprises generally a first clutch plate 204 secured to drive shaft 200 and a second clutch plate 206 secured to a sprocket 202 rotatable on shaft 200. The face of each clutch plate is provided with a ring of axial bores. The plates are secured together for rotation by means of bolts 212 extending through aligned bores in the two faces. By this arrangement, the bolts may be removed and the outer clutch plate 204 may be rotated angularly with relation to the second clutch plate 206 by means of a hand wheel 208. When the desired angularity is achieved, the bolts 212 are put through the respective aligned bores in the two plates and the shaft 200 will drive the pusher bar 183 in a different phasing with respect to the main conveyor B. In this manner very precise control is achieved over the placement of the top sheet onto the pie plate.

Actually, the adjustable clutch 204–206 on the cross sheeter is the primary means of achieving exact coordination permitting the upper dough sheet to arrive precisely on top of the filled pie shell traveling on the main conveyor. The pie plate holders are on twenty inch centers and frequently hold ten inch pie plates. Further, if the upper sheet is not placed precisely on top of the filled shell, it cannot be crimped thereto and will not provide sufficient protection for the filling and juices. Also, the dough-block may slip in the lateral rollers before it is caught, depending on the texture of the dough. Therefore, it is particularly critical in an automatic pie making machine that there be means for precisely gaging the coordinated assembly of the pie sheets forming the prepared pie.

The pusher bar 183 is firmly secured to the chain drives 184 and 186 so that the blade of the pusher bar extends substantially parallel to the direction of movement of the conveyor belt B. The pusher bar is appropriately grooved at 214 between its transverse edges to fit and slide over the stop bar 180 into contact with the dough-blocks on conveyor B. Thus the pusher 183 by fitting over the stop bar 180 and moving continuously transversely thereof across the surface of the conveyor B engages the dough-block and moves it endwise into the bight between the compression roller 185 and a cross-sheeter conveyor belt 189 which is supported and driven by a roller 187. This results in the dough-block being rolled transversely of the grain established by the divider rollers which transverse rolling serves to break up the longitudinal grains and produce a flakier pie dough.

Also, it is to be noted that the stop bar 180 permits the conveyor belt B to be slightly out of coordination or phasing with the main conveyor E. Thus, if the dough-block arrives at the stop bar slightly ahead of the time it should in order to coordinate with the main conveyor, the stop bar not only holds the block in the precise position for being fed to the cross-sheeter, but further holds it in that position for that fraction of a second before the pusher bar 183 contacts it and pushes it into the cross-sheeter in perfectly timed relation with the movement of the main conveyor. Further, the use of this stop bar permits a certain tolerance in the adjustment of the conveyor B since the conveyor B can be ahead of its coordinated position of travel by just about the length of the conveyor between successive dough blocks without causing any disruption. However, the conveyor can never be behind its coordinated position of travel as that would result in the dough blocks being contacted before being aligned by the stop bar and would result in the dough-block being pushed askew into the cross-sheeter.

A flour hopper 191 associated with the cross-feeder also provides for additional flouring of the compression roller 185 and the dough sheet formed thereby. A second compression roller 193 may also be used if it is desired to further compress the dough sheet, this second roller operating in opposition to a support plate beneath the conveyor belt so as to provide a firm compression surface. By compressing the dough in a succession of steps, the dough is not subjected to any one extreme compressing force tending to break up the dough.

Figure 16:
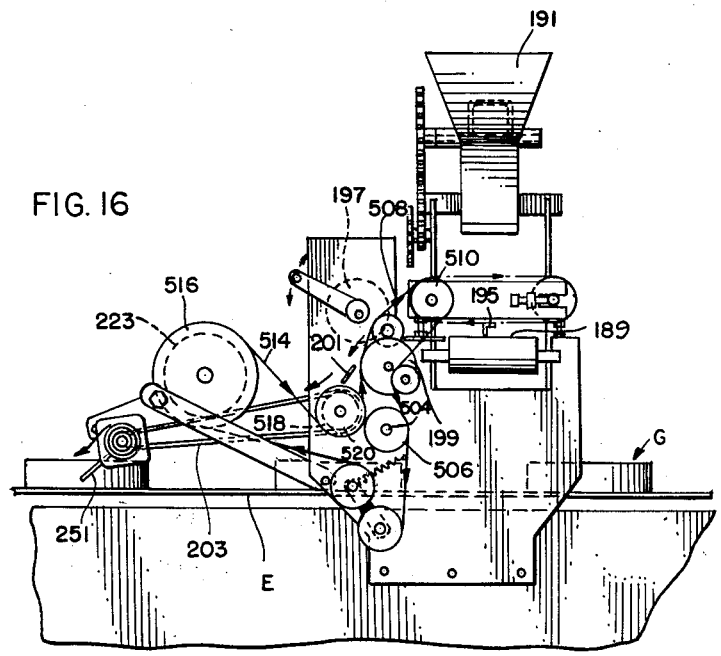
FIG. 16 is a side elevational view of the cross-sheeter shown in FIG. 15 looking to the left from the plane of line 16—16.

Having emerged from the first lateral rolling operation of the cross-sheeter, the dough-block has assumed an elongated elliptical flat shape. It is then carried by the cross-sheeter conveyor belt 189 to a second cross-rolling station where it is pushed laterally from the belt, by a pusher bar 195 into the bight between opposing compression rollers 197 and 199 which causes the elliptical sheet to be elongated along the minor axis to produce a substantially circular flat dough sheet. Pusher bar 195 is mounted on parallel rotating chains adapted to be driven through an adjustable clutch in the same manner and by similar means as were previously described in connection with pusher bar 183. As shown in FIG. 16, a suitable bridge plate is arranged to extend between the edge of the conveyor 189 and the roller 199 to support the dough as it is transferred to the rollers 197–199 by the pusher bar 195.

The compression rollers 197 and 199 serve to roll the dough once again in a direction substantially perpendicular to the preceding direction of rolling by the rollers 185 and 193. Once again this cross rolling serves to break up the grain direction established by the preceding rolling to assure a dough sheet that will produce a flaky crust. It is noteworthy that in the instant automatic pie making machine the dough is rolled transversely to its established grain twice; a longitudinal grain is established by the divider pressure rollers, the longitudinal grain is broken up and a transverse grain is established by the pressure rollers on the lateral cross-sheeter conveyor belt, and the transverse grain is further broken up by the finishing rollers of the cross-sheeter.

The finishing rollers 197 and 199 are used to provide a finished tone to the dough sheet to assure the production of a uniform flaky crust. Depending upon the character or texture of the dough which is being used, the finishing rollers may be required to rotate faster than the rate of travel of the cross-sheeter conveyor belt, slower, or at the same rate of speed in order to impart the proper tone to the sheet prior to delivery of the sheet onto the pie plate on the main conveyor.

In order to provide adjustability as to the speed of the finishing rollers within very narrow limits, the shaft 216 carrying upper finishing roller 197 is provided with a sprocket 218 carrying a chain 220 extending selectively around one of the triad of gears 222, 224, 226 all keyed for rotation on shaft 228 journaled for rotation relative to the cross-sheeter frame. Shaft 228 is adapted to be driven from the main drive shaft in a manner to be shown. However, the gears 222, 224, and 226, which differ in size by one tooth, are secured together and adapted to be moved axially into position directly beneath the upper finishing roller sprocket 218, permitting the chain 220, which can be effectively lengthened against the force of a tautening pulley, to be shifted from one sprocket to another so that a relatively minute change in speed of the upper finishing roller can be achieved. Likewise a relatively minute change in the lower finishing roller 199 is accomplished since this roller is adapted to be driven reversely by the outer perimeter of chain 220. As the dough sheet emerges from between the finishing rollers 197 and 199 of the cross-sheeter, it is guided by means of a bridge plate 201 onto a conveyor belt 203, the upper surface of which is moving substantially in the same direction and at the same rate of speed as the upper surface of the main conveyor belt E. Conveyor belt 203 then carries the substantially circular dough sheet forwardly to deposit the sheet onto the pie plate G.

*Marker or Slitter*

Figure 13:
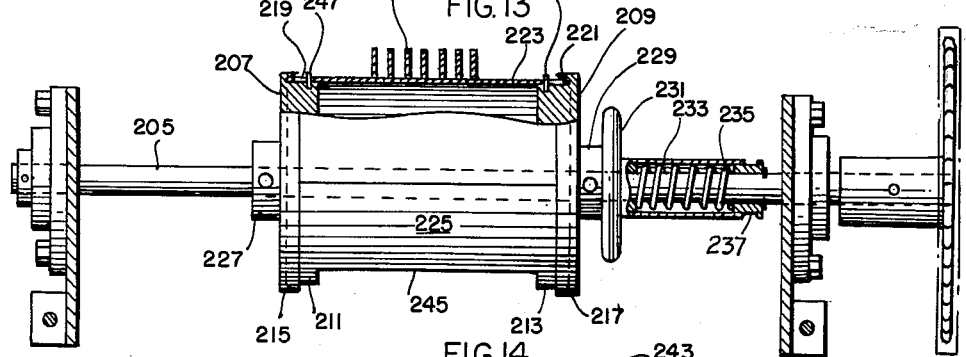
FIG. 13 is a front end elevational view of a device for automatically perforating, slitting or marking the pie cover sheets as they are being fed for delivery onto the filled pie plates passing through the machine, the device being shown with perforating pins.
Figure 14:
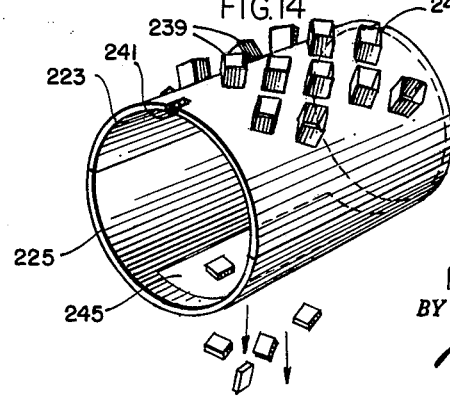
FIG. 14 is a perspective view of the device of FIG. 13 showing the operating drum provided with die means for cutting openings to form a lattice type of pie cover sheet.

Particularly in the case of the top dough sheet produced by the second cross-sheeter D, it is often desirable to mark the dough sheet with appropriate indications as to the filling contained in the particular pie. Further, it is often desirable, where marking is not required, to slit or cut the top sheet appropriately to allow the juices from the filling to emerge during baking or to provide the lattice type of top sheet. Particularly when it is desired to mark the upper sheet, it is extremely desirable that the marking device be capable of being quickly and easily changed from one marking to another marking when pies with different types of fillings are being made. As seen in FIG. 13 a plurality of perforation dies are shown used with a rotatable drum-type marker arrangement although it is to be seen in FIG. 14 that a mere change in configuration of the die members accommodates the use of the marker to provide a top sheet with a lattice-like configuration. The marker or slitter includes a rotatable drum having a body or shell comprising a pair of semi-cylindrical half-sections one of which has a plurality of perforating pins 239 extending radially outwardly and adapted to perforate the surface of the dough sheet against the moving conveyor belt 203 as the drum rotates. A shaft 205 for supporting the drum is journalled for rotation in the respective sides of the frame portion of the cross-sheeter.

A first end plate 207 and a second end plate 209 are generally circular in cross-section and are provided with inward portions 211 and 213, having a diameter less than that of the outer rimmed portions 215 and 217. The outer rimmed portions 215 and 217 are undercut to provide recessed annular grooved portions 219 and 221 which serve to position the shell halves 223 and 225 in respect to the end plates 207 and 209.

End plate 207 is provided with a sleeve 227 secured thereto and keyed for rotation with shaft 205. Second end plate 209 is provided with a sleeve 229 secured thereto and slidably keyed to shaft 205, the sleeve 229 being formed with a hand-wheel portion 231 for easy manual gripping. Sleeve 229 extends beyond wheel 231 to provide a tubular housing 233 enclosing a compression spring 235 and is adapted to move axially in telescoping relation to a stop plug 237 affixed to shaft 205.

The drum shells 223 and 225 together form a cylinder and are formed in two pieces to facilitate substituting different shells having different die members. In the embodiment shown, the upper partially cylindrical shell half 223 is shown with a plurality of radially outwardly extending perforating pins 239 which are adapted to be rotated into contact with the upper surface of the dough sheet. The upper shell is formed with opposing spaced slots 241 and 243 on the right and left hand ends respectively and adapted to receive radially outwardly extending studs 247 and 249 secured to the inward portions 211 and 213 of the end plates.

The lower shell half 225 in the embodiment shown is provided with a drop opening 245 diametrically opposed to the die members 239. The opening 245 extends circumferentially to include an arc of substantially 50°. The arc of the opening is directly related to the space between successive pie sheets since the droppings cut from the dough sheet by the die members must be deposited between the sheeter if they are not to interfere with the final product.

When it is desired to insert a die member, the wheel member 231 is pulled from left to right as viewed in FIG. 13 against the force of compression spring 233. The lower shell half 225 is placed between the two end plates 207 and 209 and guided into place on the inward portions 211 and 213 by the recessed grooves 219 and 221. Then, the upper shell half 223 is positioned between the two end plates 207 and 209 and also guided into position on the inward portions 211 and 213, by the recessed grooves 219 and 221, the opposing slots 241 and 243 being appropriately placed to receive the outwardly extending stud members 247 and 249 to prevent rotation of the shells with respect to the end plates. The wheel member 231 is then released and the compression spring 233 pushes end plate 209 from right to left as viewed in FIG. 13 and forces the ends of the shell halves into the recessed portions 219 and 221. The marking and slitting device is then ready to be rotated to contact the upper dough sheet as it travels forwardly and downwardly on conveyor belt 203. It is to be particularly noted that the opening 245 being located in diametric opposition to the die members 239 prevents material from accumulating within the shell. This is of particular importance when a marking die is used which retains cut-out dough fragments as is the case of the die shown in FIG. 14. In the arrangement shown, these cut-out portions of dough retained by the die member are pushed by successive pieces radially inwardly and as the shell member rotates and the opening 245 reaches the low point of its circular travel, the dough piece accumulation is dropped onto the moving conveyor belt between successive dough sheets so as not to interfere with the uniform thickness of these sheets. Further, with the arrangement shown, the die member may be changed quite frequently with a minimum of difficulty and quickly by merely inserting different shell halves, having different die members, between the end plates 207 and 209. This is often desirable especially when pies having different types of fillings are to be run successively through the automatic pie making machine and it is desired to have them marked accordingly.

*Drag Plate*

After the upper dough sheet has been appropriately marked or slitted, it continues to move on conveyor belt 203 downwardly toward the filled pie plates G. As the marked sheet leaves the conveyor belt 203, it is directed downwardly and forwardly by a drag plate 251. The drag plate is appropriately secured in relationship to the cross-sheeter frame to extend forwardly and downwardly from the distal end of the conveyor belt 203 to a terminal edge 253 which is formed with a centered recessed portion 255. The recessed portion is comprised of two opposed rearwardly curved portions 257 terminating in a substantially straight horizontal edge 259 located rearwardly and upwardly of the lower edges 253 of the drag plate. In effect, this configuration provides two forwardly projecting surfaces 263 which straddle the pie plate and the pie plate holder as the main conveyor belt is moved past the drag plate and permits the pie plate holder and pie plate to move through the recessed portion 255. In operation, the movement of the pie plate and the timed coordinated movement of the upper dough sheet permits the contemporaneous arrival of the forward edge of the pie plate and the forward edge of the dough sheet which is then positioned on the pie plate as the conveyor and the dough sheet, under the guidance of the recessed drag plate, move forwardly. Thus, the angle of the drag plate disposed downwardly and forwardly and the configuration of the recessed portion permits the dough sheet to be progressively laid on the top of the pie plate and filler evenly without wrinkling. Indeed, one of the primary functions of the drag plate is to permit the pie plate to pull the dough sheet from the belt 203 along an inclined surface so as to eliminate the wrinkling of the upper dough sheet which otherwise often results when the dough sheet is forced to move directly vertically downwardly onto the pie plate.

The covered filled pie plate is then moved on the conveyor belt E into an appropriate oven for baking.

*Power Diagram*

One of the major advantages of the present pie making machine arrangement is that all of the equipment previously referred to may be driven from a single power source to provide more accurate timing of the various pie making steps. It is to be understood that in the drawings relating to the power diagram the transmission of power along the main power shafts is shown diagrammatically, the selection of various power transfer devices not being of inventive significance and the clarity of understanding to be accomplished by the diagrammatic media thought most desirable.

As best seen in FIG. 1, the main drive sprocket 301 is adapted to be connected to a source of power M. Main drive sprocket 301 transmits power to the main drive shaft 303 through shaft 305 and mitre gears shown generally at 307. A pinion 306 is adapted to drive the power roller of the main conveyor E through pinion 308.

The cross-sheeter D and the conveyor B are driven by power transfer means indicated generally at 309 geared to main shaft 303. Cross-sheeter C and conveyor B' are driven by power transfer means indicated generally at 311 appropriately geared to main shaft 303. The specific drive for the cross-sheeter is described in detail later in this specification.

Main shaft 303 further provides power to the divider main power shaft 313 through mitre gears 315.

In order to maintain proper timing between the various steps accomplished by the automatic pie machine the main shaft 303 is divided and the two lengths secured by an adjustment flange 304 which permits the two lengths to be rotated relative to each other for angular adjustment.

In FIG. 5 is seen the power diagram relating to the operation of the divider from the main power shaft 303. Although in the diagram shown the various shafts are not shown as being journaled, such shafts are journaled for rotation with relationship to the sides of the divider assembly.

In the power diagram of FIG. 5, a sprocket 317 is secured for rotation with shaft 313. The power source drive chain 319 extending over the sprocket 317 and an upper sprocket 321 serves to rotate shaft 323, secured to upper sprocket 321, in a counter-clockwise direction. This also causes a second sprocket 325 on shaft 323 to be rotated in a counter-clockwise direction moving drive chain 327 and sprockets 329 and 331 in a counter-clockwise direction also. An elongated secondary drive shaft 333 affixed to rotate with sprocket 329 is connected at the far end to the crank 111 which causes the longitudinal slide member frame 99 to reciprocate longitudinally in timed relation with the vertical reciprocation cutting blades 69 and 71. The near end of the secondary drive shaft 333 is secured to a second sprocket 335 which causes drive chain 337 supported by sprockets 339, 341 and 343 to also rotate in a counter-clockwise direction. Sprocket 345 is secured to rotate shaft 347 which rotates upper right timing roller 123. Sprocket 345 is mounted to contact the outer periphery of the drive chain 337 to be turned in a clockwise direction by the movement of said drive chain in a counter-clockwise direction. Lower sprocket 343 is secured to rotate shaft 349 secured to rotate sprocket 351. Sprocket 351 drives chain 353 supported by sprockets 355 and 357 in a counter-clockwise direction. Sprocket 355 is secured to spinner roller 113, this sprocket being very small in order to achieve considerable speed of rotation for spinner 113.

The second power take-off system from the secondary drive shaft 333 is driven by outer sprocket 359 secured thereto. Outer sprocket 359 is driven counter-clockwise by the rotation of shaft 333 and drives chain 360 around conveyor sprocket 361, tertiary drive shaft sprocket 363 and sprocket 365. Sprocket 361 is affixed to shaft 367 which rotates conveyor roller 11 to move parallel spaced conveyor belts B and B' forwardly.

Tertiary drive shaft 59 is rotated in a counterclockwise direction by sprocket 363. Drive shaft 59 is secured to lower pressure roller 57 of the divider for rotation in a counter-clockwise direction and extends through the roller 57 to the opposite side of the machine. A first sprocket 373 on tertiary drive shaft 59 is adapted to contact the outer periphery of the drive chain 374 supported on sprockets 375, 377 and 379, such arrangement causing the drive chain 374 to travel in a clockwise direction. Sprocket 375 is connected to upper ribbed pressure roller 47 which is caused to move in a clockwise direction thus cooperating with the movement of the lower pressure roller 57 to move the dough slab and compress it in the direction of the movement of the conveyor belt 15. A second sprocket 381 mounted on the far-side extension 371 of the tertiary drive shaft 59 rotates a chain drive 383 in a counter-clockwise direction causing sprockets 385 and 387 to rotate in the same direction. Sprocket 385 is secured to rotate shaft 43, and sprocket 387 is secured to rotate shaft 41 in a clockwise direction. The aforementioned shafts rotate respectively disc members 25, 29, 33 and 37 and 27, 31, 35 and 39.

At the end of the tertiary drive shaft extension 371 a third sprocket 389 contacts the outer periphery of the drive chain 391, supported in its inner periphery by sprockets 393, 395 and 397. This causes sprocket 393 to rotate in a clockwise direction to rotate shaft 399 and upper-ribbed pressure roller 45 in a clockwise direction.

Sprocket 365 is secured to rotate gear 401, which matches with gear 403, to rotate shaft 94 in a clockwise direction, causing the crank arms 93 and 95 to be rotated clockwise and also shaft 96 axially aligned with shaft 94. Secured to the end of shaft 96 is a sprocket 407 which is connected to drive sprocket 409 by a drivechain 411. Sprocket 411 rotates adjustable cam-lever 149 in a clockwise direction to contact cam surface 147 and flip angle member 133 in timed relationship to the depositon of dough blocks on the channel.

A second power take-off from gear 401 is provided to rotate the agitators in the upper flour hopper. This power take-off includes a first gear 413 meshing with gear 401 and connected to rotate a second gear 415 by a shaft 417. Gear 415 rotating in a clockwise direction meshes with a gear 419 which in turn meshes with a gear 421 which is compelled thereby to rotate in a clockwise direction. Gear 421 is secured to rotate shaft 423, secured to the forwardmost agitator in the flour hopper. Gear 421 is meshed with gear 425, which in turn is meshed with gear 427 which is secured to rotate shaft 429 which rotates the rearwardmost agitator in the flour hopper in a clockwise direction.

Referring once again to the take-off shaft 119 secured to sprocket 341 it is to be noted that this shaft is rotating in a counter-clockwise direction, rotating the lower timer roller 117. The shaft extends through the preflipper timer roller 117 to a sprocket 431, which drives a chain 433 around sprockets 435 and 437 in a counterclockwise direction. A sprocket 439 connected to shaft 441 drives the upper left timer roller 121 in a counterclockwise direction by virtue of its meshing with the outer perimeter of the drive chain 433.

The manner of driving the intermittent duster mechanism in timed relationship to the arrival of dough-blocks beneath the duster on the conveyors B and B' is seen in FIGURE 3. Sprocket 330, shown in FIGURE 5, is secured to a shaft 501 secured to a second sprocket 503; second sprocket 503 drives a chain drive 505 to drive sprockets 507, 509 and 511 in a counterclockwise direction. Sprockets 507 and 509 are appropriately connected to agitator members 153 within the intermittent hopper for agitating the flour. Sprocket 511 is adapted to drive the rotating sifter-blade through an appropriate clutching mechanism which may be used to properly time the rotation of the scraper-blade 155 (see FIG. 4) to scrape the semi-cylindrical screen surface 159 as the dough-blocks arrive thereunder on the conveyors B and B'.

The manner of driving the respective cross sheeters is practically identical with the exception that the first cross sheeter C, having no drop conveyor or marker needs no power arrangement for these elements.

Figure 15:
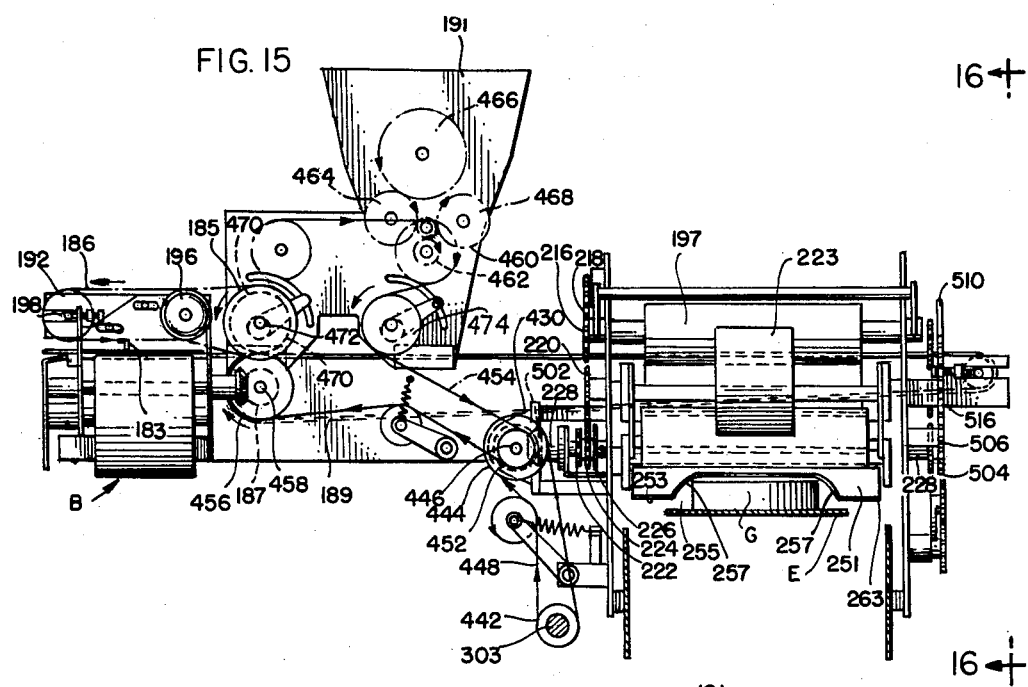
FIG. 15 is an end elevational view of the second cross-sheeter which forms the pie cover sheets.

In both cross sheeters, the power is taken off the main drive shaft 303 by a sprocket 442 which drives a sprocket 444, secured to drive shaft 446, in a clockwise manner as is seen in FIGURE 15, by means of a chain 448. Shaft 446 is supported from the cross sheeting frame by a cantilever arm 450 (FIG. 17) and carries a sprocket 452 on the extreme end for driving the outer end of the cross sheeter assembly.

Sprocket 452 drives a chain 454 the inner periphery of which drives the sprocket 456 which is secured to a shaft 458 which drives the cross-sheeter conveyor roller 187, and the sprocket 460 which is appropriately geared through gears 462, 464, 466 and 468, to drive the agitators in the flour hopper 191. The foregoing sprockets, with the exception of 466, are all driven in a clockwise direction as viewed in FIG. 15. The outer periphery of chain 454 drives sprocket 470 secured to shaft 472 for driving the pressure roller 185 in a counterclockwise direction. Likewise the outer periphery of the chain 454 drives the sprocket 474 which rotates shaft 476 secured to the second pressure roller 193 in a counterclockwise direction. As best seen in FIG. 17, a sprocket 478 is secured on the end of shaft 472 and drives sprocket 202 through chain 482 to drive the dough block sweep mechanism through the adjustable clutch 204—206.

The conveyor belt B is driven through cooperating bevel gears 484 and 486, gear 484 being secured to the end of shaft 458 and gear 486 secured to shaft 488 extending through the frame of the conveyor B and carrying a sprocket 490 on the opposing side. Sprocket 490 drives the shaft 494 of the conveyor roller 492 through chain 496 and sprocket 498.

Returning again to shaft 446, which may be referred to as the utility shaft since all of the cross-sheeter operations are driven from it, it is seen that a bevel gear 500 is adapted to drive gear triad 222, 224 and 226 through bevel gear 502 secured to shaft 228. As before mentioned in detail, the gear triad selectively drives the upper finishing roller 197 through a chain 220 the inside perimeter of which rotates upper finishing roller sprocket 218. The chain 220 is also employed, through means not shown, to drive the lower finishing roller in the direction opposite to that of the upper roller.

The shaft 228 extends through the cross-sheeter frame and on the opposing side mounts a sprocket 504 and a sprocket 506 as seen in FIGS. 15 and 16. Sprocket 504 drives chain 508 around sprocket 510 which drives the second sweep bar mechanism through the adjustable clutch 512 similar in construction and function to the previously mentioned clutch 204.

The second sprocket 506 on shaft 228 is adapted to drive chain 514 around sprocket 516 driving the marking mechanism and the outer perimeter of the chain drives the drop conveyor drive roller 518 through sprocket 520.

Throughout the description of the power diagram reference numbers for various sprockets appropriately pivotally-mounted and spring-biased into contact with the various drive belts to keep the belts in taut condition, and for sprockets used to properly delineate the travel of the chain drive around other elements have been eliminated. It is believed that an inspection of the drawings will adequately demonstrate the function of these various members in the environments shown.

*Operation of Automatic Pie Making Machine*

It will be seen from the foregoing description that the only manual operation which is necessitated in the use of the machine to produce a completed pie ready for baking is the placing of the elongated dough-slabs 2 on the respective conveyor belts 15 and 17. From this point on until the pie-making process is completed, the operations are entirely automatic and in timed, coordinated relationship.

For the purposes of facilitating the understanding of the operation of the automatic pie-making machine, this description will proceed on the basis of making but a single pie, although this invention fully intends that a plurality of pie-plates G be arranged successively on the main conveyor E and the described process repeated as to each successive pie.

When the dough-slabs 2 are placed on the conveyor belts 15 and 17, they are carried to the upper ribbed rollers 45 and 47 which cooperate with the housing guides 19, 21 and 23 to compress the slabs into elongated dough-strips each having a substantially rectangular cross-section, the strip on belt 15 being thicker than the strip on belt 17. The upper surface of the strips is then floured. The conveyor belts 15 and 17 then deliver the dough-strips to the cutting mechanism F, which progressively cuts the two parallel strips into two parallel transversely aligned rows of dough-blocks. It is to be noted that although cutter F has staggered blades, these blades are staggered longitudinally a distance equivalent to one block so that actually the front edges of corresponding dough-blocks on the two conveyors 15 and 17 are parallel and transversely aligned substantially perpendicular to the direction of travel of the belts. As these two corresponding dough-blocks are moved forwardly on conveyor belts 15 and 17 to the distal end, they are supported vertically and moved forwardly at an increased speed by spinner roller 113 to the space between upper timer rollers 121 and 123 and the lower timer roller 117. The function of these rollers is to insure delivery of the blocks to the flipper when the flipper is in the raised position for receiving dough-blocks.

As the blocks move forwardly through the timer rollers, the forward edges of the blocks are moved downwardly by the pull of gravity onto the angular flipper member 133. The angular member 133 is then oscillated downwardly in timed relation to the delivery of the blocks thereto, flipping the blocks over onto their reverse side and on to the respective conveyors B and B'. The corresponding blocks are then moved forwardly at the same rate of speed on the conveyors B and B' toward the intermittent duster. As the corresponding blocks arrive beneath the intermittent duster, the scraper blades 155 on either side of the duster are timed to scrape the partially-cylindrical screen 159 to deposit flour in a precise pattern on the upper surface of the corresponding blocks. The thicker block from the divider conveyor 15 is then moved forwardly by conveyor belt B' to the cross sheeter C where the block is aligned by stop bar 180 and held for lateral movement by the continuously moving pusher bar 183, in perfect coordinated timing, into the compression rollers.

The dough block is then converted into the elliptical dough sheet and moved forwardly where a second sweep bar pushes the sheet into a second set of rollers, the finishing rollers, transverse to the preceding rollers, where a tone or predetermined baking character is imparted to the sheet and it is compressed into a substantially circular shape. The dough sheet then moves forwardly from the finishing rollers to be deposited on the pie plate G moving with main conveyor E therebeneath.

The dough sheet on pie plate G is then moved to a docker, which compresses the dough sheet into the concave shape of the plate and trims the excess dough from the edges, through a water spray and then past a filler for depositing appropriate pie filler in the shell formed by the shaped dough sheet. The pie plate then continues its travel on main conveyor E toward the second cross-sheeter D. Simultaneously, the second dough-block on conveyor B is being moved forwardly at a rate of speed equal to that of the main conveyor E. As the second dough-block arrives at the cross-sheeter D it is moved in exactly the same manner as the first block laterally through compression rollers and then moved forwardly through finishing rollers and onto the delivery belt 203. The upper dough-sheet thus formed is then moved through the marker and onto drag plate 251 from which it is deposited onto the filled pie plate as it moves under the drag plate on conveyor E. The main conveyor then delivers the completed pie to an oven for baking.

Although but one specific embodiment of this invention has been herein shown and described, it will be understood that numerous details of the construction shown and the components thereof, may be altered or omitted without departing from the spirit of this invention as defined by the following claims.

I claim:

1. In a cross sheeter for forming and delivering dough sheets onto pie plates moving on a main conveyor and including two opposed pressure rollers mounted in a frame, the combination of a delivery conveyor extending forwardly from said rollers to receive dough sheets therefrom, and a drag plate secured relative to said frame to extend forwardly and downwardly from the distal end of said delivery conveyor toward said main conveyor, said drag plate having a cut out portion permitting said drag plate to straddle said pie plates moving on said conveyor.

2. In a cross sheeter for forming and delivering dough sheets onto pie plates moving on a main conveyor and including two opposed pressure rollers mounted for rotation in a frame, the combination of a guide bar mounted in said frame forwardly of said rollers having an upper surface inclined forwardly and downwardly to direct dough sheets forwardly from the opposed pressure rollers, a delivery conveyor extending forwardly from said guide bar to receive dough sheets therefrom, and a drag plate secured relative to said frame to extend forwardly and downwardly from the distal end of said delivery conveyor toward the upper surface of said main conveyor, said drag plate being formed with a cut out portion in its lower edge having two opposed rearwardly curved portions terminating in a substantially straight horizontal edge to provide two laterally spaced forwardly and downwardly projecting surfaces adapted to straddle the pie plates moving on said conveyor.

3. A cross sheeter for receiving dough blocks successively from a first conveyor and forming individual dough sheets from said blocks and then depositing said sheets onto pie plates carried on a continuously moving second conveyor traveling parallel to said first conveyor, comprising a stop bar disposed transversely of said first conveyor for engaging and aligning the forward edge of each dough block and preventing further forward movement thereof; a sweep bar moving continuously transversely of said first conveyor and into pushing contact with each dough block held by said stop bar, a lateral conveyor belt transversely overhanging said second conveyor and aligned with the path of said sweep bar for receiving said block therefrom, a compression roller above said lateral conveyor for compressing said dough block thereon into a sheet, a second sweep bar moving continuously transversely of said lateral conveyor to push said sheet laterally therefrom, a pair of finishing rollers aligned with the path of said second sweep bar to receive said dough sheet therefrom, means for adjusting the timing of the movement of said sweep bars into engagement with said dough block and dough sheet respectively, and a delivery conveyor extending downwardly from said finishing rollers and in the direction of travel of said second conveyor for receiving the dough sheet and depositing it onto a pie plate as it moves on said second conveyor.

4. In a cross sheeter for forming generally circular dough sheets and delivering them individually onto successive pie plates carried on a moving main conveyor and including two opposed pressure rollers mounted in a frame above said main conveyor, the combination of a delivery conveyor extending forwardly from said rollers in the direction of movement of said main conveyor and positioned to receive dough sheets from said rollers, and a drag plate secured relative to said frame to extend forwardly and downwardly from the distal end of said delivery conveyor toward the upper surface of said main conveyor, said drag plate having a cut-out portion in its lower edge and intermediate the sides thereof for permitting said drag plate to straddle the pie plates moving on said conveyor.

5. In a cross sheeter for forming and delivering dough sheets onto pie plates moving on a main conveyor and including two opposed pressure rollers mounted for rotation in a frame above said main conveyor in transverse relation therewith, the combination of a guide bar mounted in said frame forwardly of said rollers and having an upper surface inclined forwardly and downwardly in the direction of travel of the main conveyor to direct dough sheets forwardly from the opposed pressure rollers, a delivery conveyor aligned with said main conveyor and extending forwardly from said guide bar to receive dough sheets therefrom, and a drag plate secured relative to said frame to extend forwardly and downwardly from the distal end of said delivery conveyor toward the upper surface of said main conveyor, said drag plate being formed with a cut-out portion in its lower edge intermediate its sides to provide two laterally spaced forwardly and downwardly projecting surfaces adapted to straddle the pie plates moving on said conveyor.

6. In a pie machine comprising a continuously moving horizontal pie plate conveyor, an automatic dough sheeter and sheet depositor comprising a pair of horizontally journalled vertically spaced dough finishing rollers disposed above said conveyor in transverse relation therewith, a lateral conveyor belt at one side of said finishing rollers extending horizontally parallel with the axes thereof and substantially in the plane of the bight between said rollers, means for depositing dough blocks successively onto said lateral conveyor belt and means for rolling said block to sheet form on said belt, means for automatically transferring the dough sheets individually from the lateral conveyor belt into the bight of said finishing rollers for cross rolling each sheet in the direction normal to the direction in which the sheet was first rolled, a delivery belt disposed on the opposite side of said finishing rollers to receive the dough sheet from between said rollers and convey the sheet downwardly in the direction of travel of said pie plate conveyor and toward the upper surface thereof, and a drag plate extending from the distal end of said delivery belt substantially to the upper surface of said pie plate conveyor, the edge of said drag plate adjacent the pie plate conveyor having a portion intermediate its sides cut away so that the drag plate will straddle the pie plates carried on the pie plate conveyor.

7. An apparatus according to claim 6 including means for timing the said sheet transferring means to the speed of the pie plate conveyor travel and the spacing of the pie plates therealong.

8. An automatic dough sheeter and depositor comprising a pair of horizontally journalled vertically spaced dough finishing rollers, a lateral conveyor at one side of said rollers and extending horizontally in the direction of the roller axes, said conveyor comprising an endless belt having an upper run passing adjacent and substantially in the plane of the bight between said finishing rollers, means for depositing successive dough blocks onto said lateral conveyor in predetermined sequence, means for rolling each of said blocks to sheet form on said conveyor belt, means operating in timed relation with the sequence of said dough sheets for automatically transferring the dough sheets individually from the lateral conveyor belt into the bight of the finishing rollers, a delivery belt disposed on the opposite side of said finishing rollers to receive the dough sheet from between said rollers and convey the dough sheet away from said rollers, and means for adjusting the timing of said dough sheet transferring means to the sequence of the dough sheets on said lateral conveyor belt.

9. A dough sheeter depositor according to claim 8 wherein the dough sheet transferring means comprises a pusher bar movable transversely across and adjacent the surface of the upper run of said lateral conveyor belt to sweep the dough sheet toward the bight between the finishing rollers, and means for moving said pusher bar in an orbital path above said lateral conveyor and normal to the bight between the said rollers.

10. An automatic dough sheeter and depositor according to claim 8 wherein the means for depositing dough blocks successively onto said lateral conveyor belt comprises means for aligning individual dough blocks with the means for rolling said dough blocks to sheet form on the lateral conveyor belt, and means for engaging said dough blocks individually and sequentially for pushing said dough blocks toward said means for rolling the blocks to sheet form on the lateral conveyor belt.

References Cited in the file of this patent
UNITED STATES PATENTS

| | | |
|---|---|---|
| 689,848 | Booth | Dec. 31, 1901 |
| 748,392 | Manning | Dec. 29, 1903 |
| 778,295 | Williams | Dec. 27, 1904 |
| 786,816 | Hutchison | Apr. 11, 1905 |
| 787,274 | Bums | Apr. 11, 1905 |
| 821,860 | Colborne et al. | May 29, 1906 |
| 835,756 | Hutchison | Nov. 13, 1906 |
| 989,831 | Burkhardt | Apr. 18, 1911 |
| 1,259,336 | Aeschbach | Mar. 12, 1918 |
| 1,337,031 | Allatt | Apr. 13, 1920 |
| 1,480,250 | Ehrlich | Jan. 8, 1924 |
| 1,653,402 | Kaser | Dec. 20, 1927 |
| 1,748,543 | Devlin | Feb. 25, 1930 |
| 1,814,485 | Moss | July 14, 1931 |
| 1,856,585 | Parsons | May 3, 1932 |
| 1,860,491 | Burtchaell | May 31, 1932 |
| 1,871,753 | Smith | Aug. 16, 1932 |
| 2,127,651 | Panther | Aug. 23, 1938 |
| 2,160,783 | McDonald | May 30, 1939 |
| 2,440,655 | Hahn | Apr. 27, 1948 |
| 2,625,893 | Semple | Jan. 20, 1953 |
| 2,938,474 | Filler | May 31, 1960 |